No. 610,206. Patented Sept. 6, 1898.
A. L. SWETT.
BARREL HEADING PRESS.
(Application filed Aug. 30, 1897.)
(No Model.)
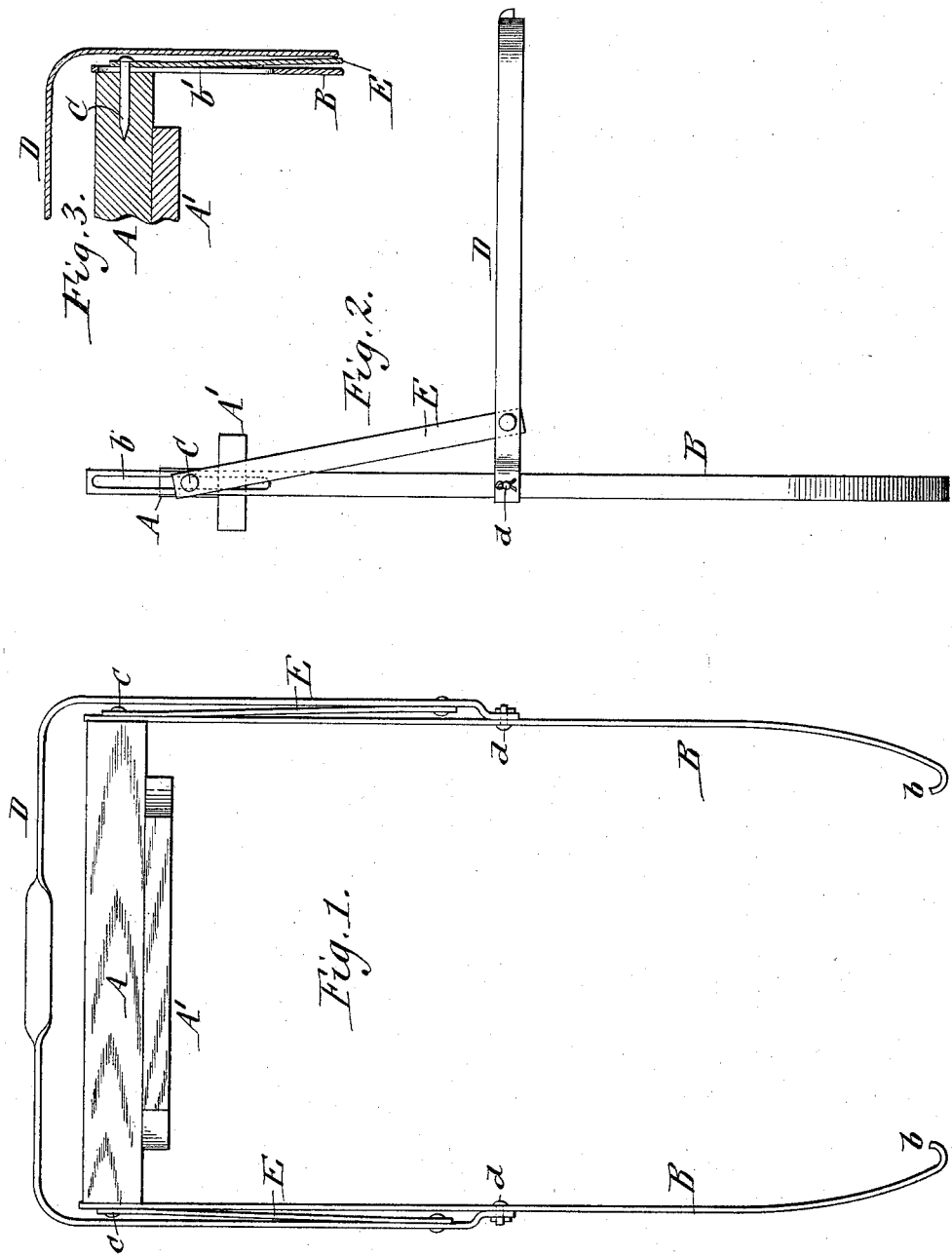

UNITED STATES PATENT OFFICE.

ALBERT L. SWETT, OF MEDINA, NEW YORK.

BARREL-HEADING PRESS.

SPECIFICATION forming part of Letters Patent No. 610,206, dated September 6, 1898.

Application filed August 30, 1897. Serial No. 649,924. (No model.)

*To all whom it may concern:*

Be it known that I, ALBERT L. SWETT, a citizen of the United States, residing at Medina, in the county of Orleans and State of New York, have invented a new and useful Improvement in Barrel-Heading Presses, of which the following is a specification.

This invention relates to the presses employed for depressing or holding down the heads of fruit and other barrels while fastening the same in place, and more especially to presses of this kind comprising a pair of upright side bars having hooks at their lower ends which catch under the staves of the barrel, a presser-head or follower movable vertically on the side bars, and a bail or yoke-shaped lever for drawing the follower downward and forcing the barrel-head into place.

My invention has for its objects to simplify the construction of these presses and reduce their cost of manufacture and to so connect the presser-head to the side bars that it is free to adapt itself to the barrel-head, so as to bear squarely thereon.

In the accompanying drawings, Figure 1 is a front view of the press, showing the presser-head raised preparatory to forcing down the barrel-head. Fig. 2 is a side elevation thereof, showing the presser-head lowered. Fig. 3 is a vertical longitudinal section, on an enlarged scale, of one end of the presser-head and adjacent side bar, showing the connection between these parts.

Like letters of reference refer to like parts in the several figures.

A is the follower, provided on its under side with the usual board A', forming with the follower a presser-head.

B B are the stationary upright side bars, provided at their lower ends with the customary hooks $b$, which engage under the barrel-staves in a well-known manner. The follower A is guided vertically on these side bars, and is connected with the upper ends thereof by horizontal bolts, screws, or pins C projecting from the ends of the follower and passing through vertical slots $b'$, formed in the side bars, as shown in Figs. 2 and 3. These connecting-bolts serve not only to connect the follower with the side bars and guide the same thereon, but also act as pivots, which permit the follower or presser-head to swivel on the side bars, thus enabling the presser-head to center or adapt itself to the surface of the barrel-head sections and bear squarely and evenly upon the same.

D is the usual bail or yoke-shaped lever whereby the follower or presser-head is operated. The arms of the bail are pivoted to the side bars at $d$ and are connected with the follower by links E, pivoted at their upper ends to the bolts C and at their lower ends to the arms of the bail near their pivots $d$. In order to form a more comfortable handle, the middle portion of the cross-bar of the bail is twisted at right angles to its remaining portion, so that the flat sides of the bar are presented to the hand.

In the use of the press, after engaging the hooks of the side bars B with the lower end of the barrel the bail is swung upward in line with the side bars in the usual manner, so as to raise the presser-head above the upper edge of the barrel, and after placing the barrel-head upon the fruit or other contents of the barrel the bail is swung down to a position beside the barrel, as shown in Fig. 2, thereby drawing down the presser-head and causing it to depress the barrel-head into its groove or seat. The barrel-head is held down until properly nailed in place, and the bail is then swung upward for raising the presser-head to its former position, when the press can be removed and applied to another barrel. The presser-head is guided in its vertical movements by its end bolts C sliding in the upright slots of the side bars, these slots being made of sufficient length to permit the necessary range of movement of the follower. This forms a very simple connection between the presser-head and the side bars, which dispenses with yokes or other separate guides at the ends of the presser-head, thus materially reducing the cost of the press.

I claim as my invention—

The combination with the side bars adapted to hook with their lower ends under the barrel and provided in their upper portions with upright slots, of a presser-head arranged between the slotted upper portions of the side bars, a bail pivoted to the middle portion of the side bars, links extending from the bail to the presser-head and arranged with their upper portions on the outer sides of the slotted upper portions of the side bars, and bolts which pass through the slots of the side bars and connect said links with the presser-head, forming a swiveling connection of the presser-head with said links and also guiding the presser-head on the side bars, substantially as set forth.

Witness my hand this 14th day of August, 1897.

ALBERT L. SWETT.

Witnesses:
CARL H. BREED,
HOMER J. LUTHER.